Patented June 2, 1953

2,640,804

UNITED STATES PATENT OFFICE 2,640,804

PURIFICATION OF SUBSTITUTED AROMATIC COMPOUNDS

William B. Whitney, Bartlesville, Okla., assignor to Phillips Petroleum Company, a corporation of Delaware No Drawing. Application December 27, 1950, Serial No. 203,035

9 Claims. (Cl. 202—57)

This invention relates to the separation of an isomer from a mixture of isomeric aromatic compounds, e. g. hydrocarbons.

In one aspect this invention relates to a method for the selective sulfurization of ortho and meta isomers in the presence of the para isomer with sulfur monochloride.

In many fields of hydrocarbon chemistry, and particularly in the petroleum and related industries there are encountered substituted aromatic hydrocarbon mixtures of nuclear isomers such as the xylenes, diethylbenzenes, ethyltoluenes, dibutyl benzene and similar dialkyl benzenoid hydrocarbons which are difficult to separate into the specific components. Mixtures of such compounds obviously offer many problems in separation since they are structural isomers of each other and have quite similar physical and chemical properties.

One of the most frequently encountered and difficult separations of this type is the separation of mixtures containing varying amounts of xylene isomers. These mixtures occur in various petroleum fractions as well as the products of coal tar processing. Methods which have been tried with varying degrees of success include distillation, crystallization, preferential sulfonation, and oxidations, and various modifications and combinations of these.

A reasonably effective separation of ortho-xylene from a mixture containing all three xylenes may be made by fractionation of the xylene mixture. Meta- and para-xylenes, however, are so close in boiling points that fractionation is ineffective to bring about separation. It has been proposed to separate meta- and para-xylene by fractional crystallization of para-xylene. Such separations, however, necessitate cooling the mixed xylenes to temperatures in the neighborhood of −60° C. and the product which then crystallizes contains meta-xylene mixed with para-xylene.

I have now discovered that a very selective reaction can be used successfully to obtain in the substantially pure state the para isomer of an aromatic compound. This reaction is the selective sulfurization of the aromatic nuclei of meta- and ortho-isomers using sulfur monochloride and obtaining by distillation the unreacted para isomer in the substantially pure state as the overhead product. It is particularly useful for separation of isomeric dialkyl benzenoid hydrocarbons such as xylenes, diethylbenzenes, cymenes, and ethyl-toluenes.

Therefore, according to the practice of this invention an isomeric mixture of aromatic compounds is contacted with sulfur monochloride under reaction conditions to cause the sulfur monochloride to react with at least one of the isomers of the mixture and then there is separated from the resulting reaction mixture a fraction rich in a disulfide of at least one of the unreacted isomers.

The sulfurization of certain aromatic nuclei by sulfur monochloride has long been known and is described in the prior art. However, there has been no indication that sulfur monochloride, when caused to react with a mixture of the isomeric hydrocarbons such as xylenes, would exhibit a pronounced selectivity toward the meta- and ortho-isomers but not for the para isomer, and that this selectivity would be of such magnitude as to afford an excellent basis for the purification of the para isomer.

The separation and purification steps can be performed in a variety of ways. As an example, a xylene mixture which comprises all three xylenes can be treated with sulfur monochloride at a temperature in the range of 20° to 135° C., preferably 40° to 80° C. and more preferably 50° to 60° C. The compounds are caused to react, at substantially atmospheric pressure, for a period of time in the range 5 to 60 minutes, preferably in the range 15 to 45 minutes and more preferably in the range 20 to 30 minutes. By fractional distillation the para-xylene will be obtained in the pure state as the overhead product, and the meta- and ortho-xylenes will remain in the kettle as disulfides. In some cases, it may be desirable to fractionate the xylene mixture comprising all three xylenes to separate ortho-xylene, to obtain a mixture comprising meta- and para-xylenes. This mixture of meta- and para-xylenes can be partially separated by fractional crystallization, in which the crystalline product will contain meta-xylene mixed with para-xylene. This product is treated with sulfur monochloride under the conditions set out herein. By fractional distillation the para-xylene can be obtained in substantially pure state as the overhead product and meta-xylene will remain in the kettle as disulfide.

Example 1

Pure ortho-xylene was treated with sulfur monochloride at 50° to 60° C. for a few minutes. A black viscous material formed having a boiling range of 190° to 200° C. at 20 mm. pressure—probably polymeric disulfides.

Example 2

Pure para-xylene was treated with sulfur monochloride at 50° to 60° C. for one hour. No reaction took place, and the pure p-xylene was recovered.

Example 3

A mixture of xylenes particularly rich in the meta- and para-isomers is obtained by processing a hydrocarbon fraction containing various amounts of xylene isomers such as is obtained from petroleum sources. One method, for example, which is used starts with a fractionation of a mixture having a high xylene content, in a high efficiency column using a high reflux ratio to remove substantially all the ortho-xylene as bottoms product and give a mixture of meta- and para-xylenes as the overhead product having a boiling range of 137° to 139° C. This mixture is then subjected to known controlled crystallization procedures (usually only one crystallization step is employed) to separate out an enriched para-xylene fraction. This para-xylene fraction is treated with sulfur monochloride at a temperature in the range of 50° to 60° C. until the reaction is complete, usually requiring only a few minutes. The mixture distilled to remove the para-xylene in the pure state as the overhead product and the disulfide of the meta-xylene removed as a bottoms product.

Example 4

Para ditertiary butyl benzene was treated with sulfur monochloride at a temperature of 95° to 110° C. and continued up to 135° C. to boil off the excess sulfur monochloride. The para-ditertiary butyl benzene was unreacted, while a small amount of impurity reacted and yielded the disulfide—a yellow solid with a melting point of 103° C.

Example 5

A mixture of xylenes consisting of 28.3 grams para-xylene, 61.0 grams meta-xylene, 2.1 grams ortho-xylene and also containing 6.7 grams ethyl benzene was treated with 25 grams sulfur monochloride at a temperature in the range of 50° to 60° C. until the reaction was complete which required about 15 minutes. The mixture was fractionated in a column. The analysis of the distillate is tabulated below:

| | Grams |
|---|---|
| Para-xylene | 28.5 |
| Meta-xylene | 34.1 |
| Ortho-xylene | 1.9 |
| Ethyl benzene | 7.0 |

Example 6

The mixture of xylenes and ethyl benzene described in Example 5 was treated with 50 grams sulfur monochloride at a temperature in the range of 50° to 60° C. until the reaction was complete which required about 20 minutes. The mixture was fractionated in a column. The analysis of the distillate is tabulated below:

| | Grams |
|---|---|
| Para-xylene | 31.8 |
| Meta-xylene | 4.1 |
| Ortho-xylene | 1.7 |
| Ethyl benzene | 8.0 |

It can be readily seen from Examples 5 and 6 that essentially pure para isomer is obtainable from isomeric mixtures of aromatic hydrocarbons by treatment with sulfur monochloride. In Example 5 less than the stoichiometric amount of sulfur monochloride, required to react with the meta-xylene and ortho-xylene present, was used and yet a very good separation was obtained. Thus it may be seen that a substantially pure para-xylene may be obtained from a xylene mixture by a single stage or two stage reaction with sulfur monochloride.

Variation and modification are possible within the scope of the foregoing disclosure and the appended claims to the invention the essence of which is that para substituted aromatic hydrocarbons can be separated from mixtures of ortho and meta isomers by selective sulfurization of the ortho and meta isomers with sulfur monochloride followed by distillation of the para isomer from the higher boiling disulfides produced.

I claim:

1. A non-catalytic process for separating para substituted dialkyl benzenoid hydrocarbons from isomeric mixtures containing meta- and ortho-isomers of said hydrocarbon compounds which comprises contacting said isomeric mixture with at least the stoichiometric amount of sulfur monochloride required to sulfurize the meta- and ortho-isomers under reacting conditions whereby the meta- and ortho-isomers are selectively sulfurized and distilling the substantially unreacted para isomer from the resulting mixture.

2. A non-catalytic process for separating para-xylene from an isomeric mixture of xylenes which comprises contacting the isomeric mixture with sulfur monochloride at a temperature in the range 40° to 80° C. for a period of time in the range of 15 to 45 minutes and at substantially atmospheric pressure so as to convert any meta-xylenes present to corresponding disulfides and distilling para-xylene from the resulting mixture.

3. A non-catalytic process for separating para-xylene from an isomeric mixture of xylenes which comprises contacting the isomeric mixture with sulfur monochloride at a temperature in the range 50° to 60° C. for a period of time in the range 20 to 30 minutes and at substantially atmospheric pressure so as to convert any meta- and ortho-xylenes present to corresponding disulfides and distilling para-xylene from the resulting mixture.

4. A non-catalytic process for the separation of the para-isomer from isomeric mixtures of dialkyl benzenoid hydrocarbons selected from the group consisting of xylenes, diethyl benzenes, cymenes and ethyltoluenes which comprises reacting said isomeric mixture with sulfur monochloride at a temperature in the range 20 to 135° C. for a period of time in the range 20 to 30 minutes and at substantially atmospheric pressure whereby the meta- and ortho-isomers are selectively sulfurized and distilling the substantially unreacted para isomer from the resulting higher boiling disulfides of the meta and ortho isomers.

5. The process of claim 4 wherein the isomeric mixture comprises para, ortho, and meta xylenes.

6. The process of claim 4 wherein the isomeric mixture comprises para, meta, and ortho diethylbenzenes.

7. The process of claim 4 wherein the isomeric mixture comprises para, meta, and ortho cymenes.

8. The process of claim 4 wherein the isomeric mixture comprises para, meta, and ortho ethyltoluenes.

9. A non-catalytic process for separating substantially pure para-xylene from an isomeric mixture of para-, meta-, and ortho-xylenes which comprises distilling said mixture so as to recover substantially pure ortho-xylene as a bottoms product and a mixture of para- and meta-xylenes as an overhead product; contacting said mixture of para- and meta-xylenes with an excess of sulfur monochloride at a temperature in the range 50 to 60° C. for a period of time in the range 20 to 30 minutes and at substantially atmospheric pressure, whereby the meta-xylene is substantially converted to the corresponding disulfide; and distilling substantially pure para-xylene from the resulting mixture.

WILLIAM B. WHITNEY.

References Cited in the file of this patent

UNITED STATES PATENTS

| Number | Name | Date |
|---|---|---|
| 2,402,685 | Signaigo | June 25, 1946 |